United States Patent
Zhang et al.

(10) Patent No.: US 12,348,483 B2
(45) Date of Patent: Jul. 1, 2025

(54) DEVICE IDENTIFICATION METHOD AND RELATED APPARATUS

(71) Applicant: HUAWEI TECHNOLOGIES CO., LTD., Shenzhen (CN)

(72) Inventors: Bo Zhang, Shenzhen (CN); Ping Huang, Dongguan (CN); Kai Zhu, Dongguan (CN); Shusheng Liu, Shenzhen (CN); Haiyan Wang, Wuhan (CN); Bin Zhou, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 690 days.

(21) Appl. No.: 17/585,188

(22) Filed: Jan. 26, 2022

(65) Prior Publication Data
US 2022/0150216 A1  May 12, 2022

Related U.S. Application Data

(63) Continuation of application No. PCT/CN2020/103624, filed on Jul. 22, 2020.

(30) Foreign Application Priority Data

Jul. 31, 2019  (CN) .......................... 201910714829.0

(51) Int. Cl.
*H04W 4/00* (2018.01)
*H04L 61/5014* (2022.01)
(Continued)

(52) U.S. Cl.
CPC ......... *H04L 61/5014* (2022.05); *H04W 48/16* (2013.01); *H04L 2101/622* (2022.05); *H04W 84/12* (2013.01)

(58) Field of Classification Search
CPC .......................... H04L 61/5014; H04W 48/16
(Continued)

(56) References Cited

U.S. PATENT DOCUMENTS

2014/0161027 A1   6/2014 Larue et al.
2015/0304983 A1*  10/2015 Krening .............. H04W 64/003
                                                     370/254
(Continued)

FOREIGN PATENT DOCUMENTS

CN      103795631 A    5/2014
CN      104639667 A    5/2015
(Continued)

OTHER PUBLICATIONS

Toshihiro Nakakura et al., "Infrastructure Construction to Enable Optimum Network Accessibility for Connected Model Types," (Building Infrastructure to Enable Connectivity Models for Optimum Network Connection); IPSJ (Information Processing Society of Japan), SIG (Special Interest Group) Technical Report, Mar. 4, 2010; pp. 1-7, Including an English translation, 26 total pages.
(Continued)

*Primary Examiner* — Temica M Beamer
(74) *Attorney, Agent, or Firm* — Rimon PC

(57) ABSTRACT

Embodiments of this application disclose a device identification method and a related apparatus, to reduce costs of identifying whether a device that accesses a network is an AP device. The method in the embodiments of this application includes: when a type of the device that accesses the network needs to be identified, obtaining a MAC address of the access device, and obtaining a MAC address of a Wi-Fi hotspot around a network access device; and then comparing the MAC address of the access device with the MAC address of the Wi-Fi hotspot, and determining, if the MAC address of the access device and the MAC address of the Wi-Fi (Continued)

hotspot belong to a same address segment, that the access device is an AP device.

20 Claims, 6 Drawing Sheets

(51) Int. Cl.
*H04W 48/16* (2009.01)
*H04L 101/622* (2022.01)
*H04W 84/12* (2009.01)

(58) Field of Classification Search
USPC .......................................................... 370/329
See application file for complete search history.

(56) References Cited

U.S. PATENT DOCUMENTS

2018/0124096 A1* 5/2018 Schwartz ................ H04W 8/22
2019/0335324 A1* 10/2019 Ringland ............ H04L 61/5007

FOREIGN PATENT DOCUMENTS

| CN | 106413001 A | 2/2017 |
| CN | 106851779 A | 6/2017 |
| CN | 107197456 A | 9/2017 |
| CN | 104837179 B | 2/2019 |
| CN | 109451518 A | 3/2019 |
| CN | 109743745 A | 5/2019 |
| EP | 1294129 A2 | 3/2003 |
| JP | 2013537785 A | 10/2013 |
| JP | 2017005462 A | 1/2017 |
| KR | 101360348 B1 | 2/2014 |

OTHER PUBLICATIONS

Hiroya Suzuki et al., "Home Estimation using MAC Address Histories," Proceedings of the Symposium on Multimedia, Distributed, Cooperation, and Mobile (DICOMO2015), IPSJ Symposium Series vol. 2015, No. 1; Jul. 31, 2015; pp. 874-881, including an English translation, 39 total pages.

* cited by examiner

DEVICE IDENTIFICATION METHOD AND RELATED APPARATUS

CROSS-REFERENCE TO RELATED APPLICATIONS

This application is a continuation of International Application No. PCT/CN2020/103624, filed on Jul. 22, 2020, which claims priority to Chinese Patent Application No. 201910714829.0, filed on Jul. 31, 2019. The disclosures of the aforementioned applications are hereby incorporated by reference in their entireties.

TECHNICAL FIELD

This application relates to the field of internet technologies, and in particular, to a device identification method and a related apparatus.

BACKGROUND

As internet technologies develop, more families use home networks. A home user usually purchases a broadband internet access service provided by an operator to build a home network. Generally, the operator provides only a network access device (such as a home gateway) for the user to access the network. In some scenarios, to enable more devices to access the network, the user usually selects to purchase an access point (AP) device (for example, a router) to implement home networking.

In a scenario in which a user self-purchases an AP device for home networking, when the user reports a fault to an operator due to a home network fault, network maintenance personnel need to intuitively learn whether there is a self-purchased AP device at the user's home, to determine whether the network fault is caused by the self-purchased AP device of the user.

Currently, determining whether there is a self-purchased AP device at the user's home usually means identifying specific information (such as a vendor and a model) about a device that accesses a network at the user's home, and then further determining, based on the information about the device such as the vendor and the model, whether the device is an AP device. An identification library needs to be established first in this solution. The identification library includes information such as vendors and models corresponding to various AP devices in the market. However, for an AP device, there are many vendors that can produce the AP device, and each vendor further launches a large quantity of new AP devices of different models in different periods. As a result, maintenance costs of the identification library are relatively high. Therefore, an identification solution with low costs is required to identify whether a device that accesses a network is an AP device.

SUMMARY

Embodiments of this application provide a device identification method and a related apparatus, to reduce costs of identifying whether a device that accesses a network is an AP device.

A first aspect of the embodiments of this application provides a device identification method, including:

When a type of a device (that is, an access device) that accesses a network needs to be identified, a network access device (for example, a gateway device) may obtain a MAC address of the access device and a MAC address of a Wi-Fi hotspot around the network access device. Then, the network access device compares the MAC address of the access device and the MAC address of the Wi-Fi hotspot. If the MAC address of the access device and the MAC address of the Wi-Fi hotspot belong to a same address segment, it may be considered that the access device and a device that enables the Wi-Fi hotspot are a same device, in other words, it may be considered that the access device is an AP device that can provide a wireless access service.

Alternatively, when a type of an access device needs to be identified, a server may obtain, by using a network access device (for example, a gateway device connected to the server), a MAC address of the access device and a MAC address of a Wi-Fi hotspot around the network access device. Then, the server compares the MAC address of the access device and the MAC address of the Wi-Fi hotspot. If the MAC address of the access device and the MAC address of the Wi-Fi hotspot belong to a same address segment, it may be considered that the access device and a device that enables the Wi-Fi hotspot are a same device, in other words, it may be considered that the access device is an AP device that can provide a wireless access service.

In this embodiment of this application, the MAC address of the access device and the MAC address of the Wi-Fi hotspot at a user's home are obtained, and then whether the MAC address of the access device and the MAC address of the Wi-Fi hotspot belong to a same segment of consecutive addresses can be determined, to determine whether the access device is an AP device. In the identification process, only the MAC address of the access device and the MAC address of the Wi-Fi hotspot need to be obtained, and an identification library does not need to be maintained. Therefore, identification costs can be reduced.

With reference to the first aspect, in a first implementation of the first aspect of the embodiments of this application, a specific manner of determining whether the MAC address of the access device and the MAC address of the Wi-Fi hotspot belong to a same address segment may be: determining whether an absolute value of a difference between the MAC address of the access device and the MAC address of the Wi-Fi hotspot is less than or equal to a preset threshold; and if the absolute value of the difference is less than or equal to the preset threshold, determining that the access device is an AP device.

This implementation proposes a specific implementation of determining whether the MAC address of the access device and the MAC address of the Wi-Fi hotspot belong to a same address segment. During actual application, whether the absolute value of the difference between the two MAC addresses is less than or equal to the preset threshold may be determined, to determine whether the two MAC addresses belong to a same address segment. This improves feasibility of the solution.

With reference to the first aspect, in a second implementation of the first aspect of the embodiments of this application, a specific manner of determining whether the MAC address of the access device and the MAC address of the Wi-Fi hotspot belong to a same address segment may be: determining whether a first digital value to an $N^{th}$ digital value of the MAC address of the access device are the same as a first digital value to an $N^{th}$ digital value of the MAC address of the Wi-Fi hotspot; and if the first digital value to the $N^{th}$ digital value of the MAC address of the access device are the same as the first digital value to the $N^{th}$ digital value of the MAC address of the Wi-Fi hotspot, determining that the access device is an AP device.

This implementation proposes a specific implementation of determining whether the MAC address of the access device and the MAC address of the Wi-Fi hotspot belong to a same address segment. During actual application, whether the first digital values to the $N^{th}$ digital values corresponding to the two MAC addresses are the same may be determined, to determine whether the two MAC addresses belong to a same address segment. This improves feasibility of the solution.

With reference to the first aspect, the first implementation of the first aspect, or the second implementation of the first aspect, in a third implementation of the first aspect of the embodiments of this application, if a device that needs to identify the type of the access device is a server, the server may send an address obtaining request to a network access device. The address obtaining request is used to indicate to the network access device to obtain the MAC address of the access device and the MAC address of the Wi-Fi hotspot. The address obtaining request may be specifically one piece of request information, used to request to obtain the MAC address of the access device and the MAC address of the Wi-Fi hotspot. Alternatively, the address obtaining request may be two pieces of request information, used to request to obtain the MAC address of the access device and the MAC address of the Wi-Fi hotspot, respectively. Then, after the network access device obtains the corresponding MAC addresses based on the address obtaining request sent by the server, the server may receive the MAC address of the access device and the MAC address of the Wi-Fi hotspot that are returned by the network access device.

In this implementation, it is clear that the server sends the address obtaining request to the network access device, to obtain the MAC address of the access device and the MAC address of the Wi-Fi hotspot that are returned by the network access device. This improves implementation flexibility of the solution.

With reference to the first aspect, the first implementation of the first aspect, or the second implementation of the first aspect, in a fourth implementation of the first aspect of the embodiments of this application, if a device that needs to identify the type of the access device is a network access device, software (for example, an agent service) built into the network access device may generate a device information obtaining command, and then the network access device obtains DHCP information (that is, information corresponding to the access device connected to the network access device) according to the device information obtaining command. The DHCP information includes information such as a name of the access device and the MAC address of the access device. Therefore, the network access device may obtain the MAC address of the access device by obtaining the DHCP information. In addition, the software built into the network access device may further generate a hotspot information obtaining command, and then the network access device enables, according to the hotspot information obtaining command, a Wi-Fi chip to collect information about a surrounding Wi-Fi hotspot. The Wi-Fi hotspot information includes information such as a name of the Wi-Fi hotspot and the MAC address of the Wi-Fi hotspot. Therefore, the network access device may obtain the MAC address of the Wi-Fi hotspot by obtaining the Wi-Fi hotspot information.

This implementation clarifies an implementation in which the network access device obtains the MAC address of the access device and the MAC address of the Wi-Fi hotspot. This improves implementation flexibility of the solution.

With reference to the fourth implementation of the first aspect, in a fifth implementation of the first aspect of the embodiments of this application, after the network access device determines that the access device is an AP device, the network access device may actively report information about the access device determined as an AP device to a server, so that the server side can obtain the information about the access device in time. The information about the access device includes one or more of the name of the access device or the MAC address of the access device.

In this implementation, it is clear that, after the network access device determines that the access device is an AP device, the network access device actively reports the information about the access device to the server, so that the server can obtain the information about the access device in time.

With reference to the fourth implementation of the first aspect, in a sixth implementation of the first aspect of the embodiments of this application, after the network access device determines that the access device is an AP device, the network access device may temporarily store information about the access device locally. After receiving a device identification request sent by a server, the network access device sends the information about the access device identified as an AP device to the server. The information about the access device includes one or more of the name of the access device or the MAC address of the access device.

In this implementation, it is clear that only after receiving the device identification request sent by the server, the network access device sends the information about the access device to the server, to avoid frequently sending the information to the server and reduce signaling consumption.

With reference to the fourth implementation of the first aspect, in a seventh implementation of the first aspect of the embodiments of this application, after the network access device determines that the MAC address of the access device and the MAC address of the Wi-Fi hotspot belong to a same address segment, the network access device may determine that the access device and a device that enables the Wi-Fi hotspot are a same device, and may associate the information about the access device with the Wi-Fi hotspot information. When the server subsequently needs to obtain information about whether the access device and the device that enables the Wi-Fi hotspot are the same device, corresponding information can be quickly provided.

In this implementation, it is proposed that, after determining that the MAC address of the access device and the MAC address of the Wi-Fi hotspot belong to a same address segment, the network access device may determine that the access device and the device that enables the Wi-Fi hotspot are the same device. Therefore, in some scenarios required to determine whether the access device and the device that enables the Wi-Fi hotspot are the same device, the corresponding information is quickly provided to improve flexibility of the solution.

A second aspect of the embodiments of this application provides a device identification apparatus, including: an obtaining module, configured to obtain a media access control MAC address of an access device, where the obtaining module is further configured to obtain a MAC address of a wireless fidelity Wi-Fi hotspot; and a determining module, configured to: if the MAC address of the access device and the MAC address of the Wi-Fi hotspot belong to a same address segment, determine that the access device is an access point AP device, where the address segment includes a plurality of consecutive MAC addresses.

In this embodiment of this application, the MAC address of the access device and the MAC address of the Wi-Fi hotspot at a user's home are obtained, and then whether the MAC address of the access device and the MAC address of the Wi-Fi hotspot belong to a same segment of consecutive addresses can be determined, to determine whether the access device is an AP device. In the identification process, only the MAC address of the access device and the MAC address of the Wi-Fi hotspot need to be obtained, and an identification library does not need to be maintained. Therefore, identification costs can be reduced.

With reference to the second aspect, in a first implementation of the second aspect of the embodiments of this application, the determining module is further configured to: if an absolute value of a difference between the MAC address of the access device and the MAC address of the Wi-Fi hotspot is less than or equal to a preset threshold, determine that the access device is an AP device.

This implementation proposes a specific implementation of determining whether the MAC address of the access device and the MAC address of the Wi-Fi hotspot belong to a same address segment. During actual application, whether the absolute value of the difference between the two MAC addresses is less than or equal to the preset threshold may be determined, to determine whether the two MAC addresses belong to a same address segment. This improves feasibility of the solution.

With reference to the second aspect, in a second implementation of the second aspect of the embodiments of this application, the determining module is further configured to: if a first digital value to an $N^{th}$ digital value of the MAC address of the access device are the same as a first digital value to an $N^{th}$ digital value of the MAC address of the Wi-Fi hotspot, determine that the access device is an AP device, where N is an integer greater than 1.

This implementation proposes a specific implementation of determining whether the MAC address of the access device and the MAC address of the Wi-Fi hotspot belong to a same address segment. During actual application, whether first digital values to $N^{th}$ digital values corresponding to the two MAC addresses are the same may be determined, to determine whether the two MAC addresses belong to a same address segment. This improves feasibility of the solution.

With reference to the second aspect, the first implementation of the second aspect, or the second implementation of the second aspect, in a third implementation of the second aspect of the embodiments of this application, the apparatus further includes: a sending module, where the sending module is configured to send an address obtaining request to a network access device. The address obtaining request is used to indicate the network access device to obtain the MAC address of the access device and the MAC address of the Wi-Fi hotspot. The obtaining module is further configured to obtain the MAC address of the access device that is sent by the network access device. The obtaining module is further configured to obtain the MAC address of the Wi-Fi hotspot that is sent by the network access device.

In this implementation, it is clear that the server sends the address obtaining request to the network access device, to obtain the MAC address of the access device and the MAC address of the Wi-Fi hotspot that are returned by the network access device. This improves implementation flexibility of the solution.

With reference to the second aspect, the first implementation of the second aspect, or the second implementation of the second aspect, in a fourth implementation of the second aspect of the embodiments of this application, the apparatus further includes: a generation module, where the generation module is configured to generate a device information obtaining command. The obtaining module is further configured to obtain DHCP information according to the device information obtaining command, where the DHCP information includes the MAC address of the access device. The generation module is further configured to generate a hotspot information obtaining command. The obtaining module is further configured to obtain Wi-Fi hotspot information in a target area according to the hotspot information obtaining command, where the Wi-Fi hotspot information includes the MAC address of the Wi-Fi hotspot.

This implementation clarifies an implementation in which the network access device obtains the MAC address of the access device and the MAC address of the Wi-Fi hotspot. This improves implementation flexibility of the solution.

With reference to the fourth implementation of the second aspect, in a fifth implementation of the second aspect of the embodiments of this application, the sending module is further configured to send information about the access device determined as an AP device to a server. The information about the access device includes one or more of the MAC address or a device name.

In this implementation, it is clear that, after the network access device determines that the access device is an AP device, the network access device actively reports the information about the access device to the server, so that the server can obtain the information about the access device in time.

With reference to the fourth implementation of the second aspect, in a sixth implementation of the second aspect of the embodiments of this application, the apparatus further includes: a receiving module, where the receiving module is configured to receive a device identification request sent by a server. The sending module is further configured to send to the server based on the device identification request, information about the access device determined as an AP device. The information about the access device includes one or more of the MAC address or a device name.

In this implementation, it is clear that only after receiving the device identification request sent by the server, the network access device sends the information about the access device to the server, to avoid frequently sending the information to the server and reduce signaling consumption.

With reference to the fourth implementation of the second aspect, in a seventh implementation of the second aspect of the embodiments of this application, the determining module is further configured to: if the MAC address of the access device and the MAC address of the Wi-Fi hotspot belong to a same address segment, determine that the access device and a device that enables the Wi-Fi hotspot are a same device.

In this implementation, it is proposed that, after determining that the MAC address of the access device and the MAC address of the Wi-Fi hotspot belong to a same address segment, the network access device may determine that the access device and the device that enables the Wi-Fi hotspot are the same device. Therefore, in some scenarios required to determine whether the access device and the device that enables the Wi-Fi hotspot are the same device, the corresponding information is quickly provided to improve flexibility of the solution.

A third aspect of the embodiments of this application provides a network device, including at least one processor. The at least one processor is configured to: be coupled to a memory, and read and execute instructions in the memory, to implement the method in the first aspect.

A fourth aspect of the embodiments of this application provides a computer-readable storage medium. The computer storage medium stores a computer program, the computer program includes program instructions, and when the program instructions are executed by a processor, the processor is enabled to perform the method in the first aspect.

A fifth aspect of the embodiments of this application provides a computer program product. When the computer program product runs on a computer, the computer is enabled to perform the method in the first aspect.

It can be learned from the foregoing technical solutions that the embodiments of this application have the following advantages.

In the embodiments of this application, the MAC address corresponding to the access device and the MAC address of the Wi-Fi hotspot at a user's home are obtained, and then whether the MAC address of the access device and the MAC address of the Wi-Fi hotspot belong to a same segment of consecutive addresses is determined, to determine whether the access device and the device that enables the Wi-Fi hotspot are the same device, and then identify whether the access device is an AP device. In the identification process, only the MAC address of the access device and the MAC address of the Wi-Fi hotspot need to be obtained, and an identification library does not need to be maintained. Therefore, identification costs can be reduced.

DESCRIPTION OF EMBODIMENTS

Figure 1:
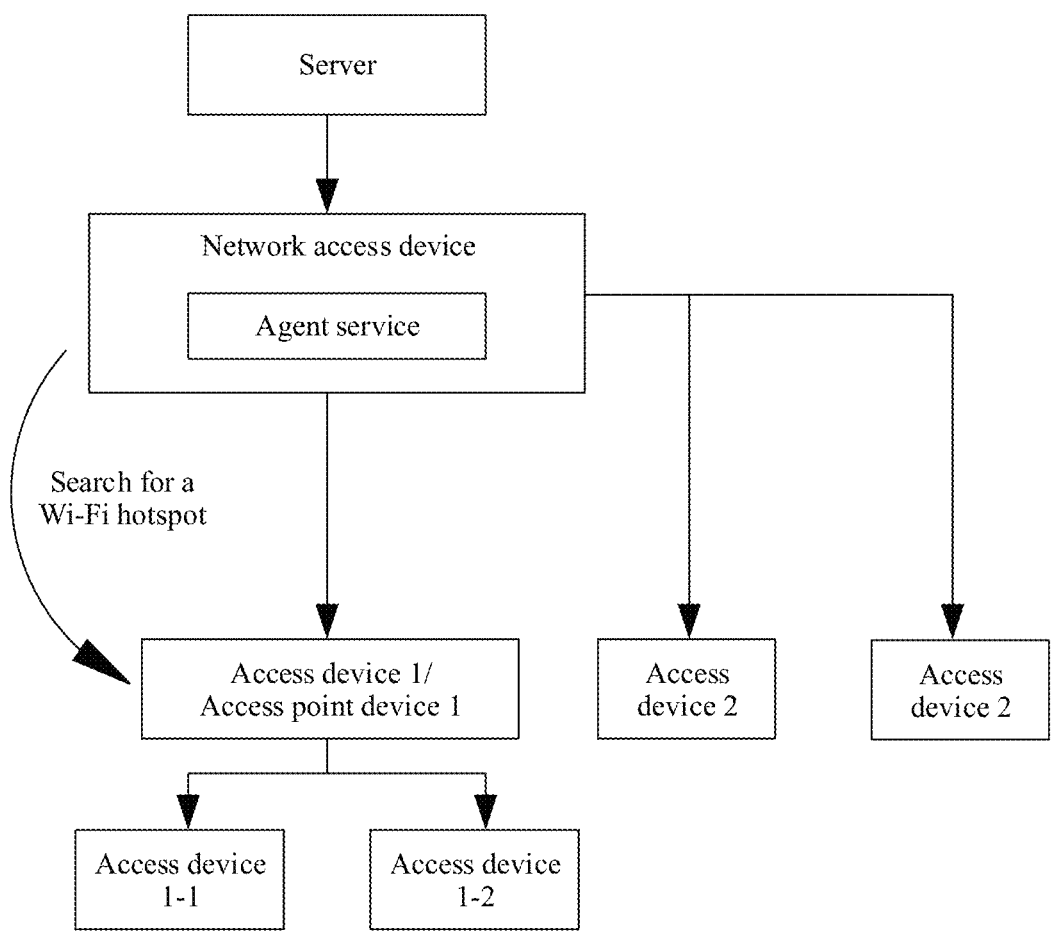
FIG. 1 is an example of a system architecture according to an embodiment of this application.

Embodiments of this application provide a device identification method and a related apparatus, to reduce costs of identifying whether an access device is an AP device.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in appropriate circumstances, so that the embodiments of this application described herein can be implemented in other orders than the order illustrated or described herein. In addition, the terms "include", "have", and any other variants mean to cover the non-exclusive inclusion, for example, a process, method, system, product, or device that includes a list of steps or units is not necessarily limited to those expressly listed steps or units, but may include other steps or units that are not expressly listed or inherent to such a process, method, product, or device.

For ease of understanding, the following describes several terms used in the embodiments of this application.

Network access device: A network access device in this embodiment is a device that can provide a network access service. For example, the network access device may be a gateway, a router, a switch, a digital subscriber line (DSL), a passive optical network (PON), or the like.

Access device: An access device in this embodiment is a device that implements network access by accessing a network access device. For example, the access device may be a device that has a network access function, such as a personal computer, a notebook computer, a mobile phone, a smart speaker, or a router.

Access point (AP) device: An AP device in this embodiment is a device that can provide a wireless access service. The AP device may access a network by using a network access device, and may provide a wireless hotspot to share the network, so that another device may implement network access by accessing the network shared by the AP device. Generally, the AP device is also an access device in essence. For example, the AP device may be a terminal device that can provide a wireless hotspot, such as a smartphone, a notebook computer, or a router.

Media access control (MAC) address: A MAC address is also referred to as an Ethernet ID or a physical address, and is an address used to determine a location of a network device. The MAC address has 48 bits (namely, 6 bytes), and is usually represented by 12 hexadecimal digits. Every two hexadecimal digits are separated by a colon. For example, 08:00:20:0A:8C:6D is a MAC address. The first six hexadecimal digits 08:00:20 indicate a number of a network hardware manufacturer, and is allocated by the institute of electrical and electronics engineers (IEEE). The last six hexadecimal digits OA:8C:6D indicate a serial number of a network product (such as a network adapter) manufactured by the manufacturer. Generally, the MAC address is unique in the world as long as the MAC address is not changed.

Wireless fidelity (Wi-Fi): Wi-Fi is a wireless local area network technology, and is used for connecting electronic terminals in a wireless manner. Generally, a wireless hotspot provided by an AP device may be referred to as a Wi-Fi hotspot.

Application programming interface (API): An API is some predefined functions or a convention for connecting different components of a software system, and is a set of definitions, programs, and protocols. In this embodiment, an objective of the API is to enable an agent service to obtain information about a network access device through the API.

Agent service: An agent service in this embodiment is a software service built in a network access device, and may be installed on the network access device through a communication protocol (for example, the Technical Report 069 (TR-069) protocol). The agent service is used to send a command to the network access device, to obtain a required MAC address.

Dynamic host configuration protocol (DHCP): A DHCP in this embodiment is a network protocol of a local area network, and is mainly used for centralized management and allocation of an IP address, so that a device in a network environment dynamically obtains information such as the IP address. DHCP information is information corresponding to an access device to which an IP address has been allocated.

Message queuing telemetry transport (MQTT): MQTT is a message protocol based on a publish-subscribe paradigm. In this embodiment, the MQTT is mainly used for communication between a server and a network access device.

The following describes an application scenario and a system architecture to which the embodiments of this application are applicable.

In a scenario in which a user self-purchases an AP device for home networking, when the user reports a fault to an operator due to a home network fault, network maintenance personnel need to intuitively learn whether there is a self-purchased AP device at a user's home, and to determine whether the network fault is caused by the self-purchased AP device of the user. Therefore, the method provided in the embodiments of this application may be used in the scenario of identifying whether there is an AP device at the user's home.

FIG. 1 is an example of a system architecture according to an embodiment of this application. Through a network, a server is in communication connection with an agent service built into a network access device, and the server and the agent service may receive and send information from each other. The network access device accesses a plurality of access devices through network interface of the network access device. In other words, the plurality of access devices access the network access device to implement network access. An access device 1 is also an AP device, and can enable a wireless hotspot to provide a wireless access service for another device. One or more access devices may be mounted to the AP device, and the access devices mounted to the AP device can implement network access by using the AP device. In addition, the network access device may search for the wireless hotspot, to obtain information about the wireless hotspot corresponding to the AP device.

The network access device in this embodiment of this application may be specifically a device that can provide a network access service, such as a gateway, a router, a switch, a DSL, or a PON. This is not specifically limited herein. In this embodiment and subsequent embodiments, only the network access device is used as an example for description.

In addition, the access device may be a device that has a network access function, such as a personal computer, a notebook computer, a mobile phone, a smart speaker, or a router. This is not specifically limited herein. In this embodiment and subsequent embodiments, only the access device is used as an example for description.

It should be noted that, in the embodiments of this application, a process of identifying a device may be performed on a network access device side, or may be performed on a server side. For ease of understanding, the following separately describes in detail the device identification method provided in the embodiments of this application from two perspectives: the network access device and the server.

Figure 2:
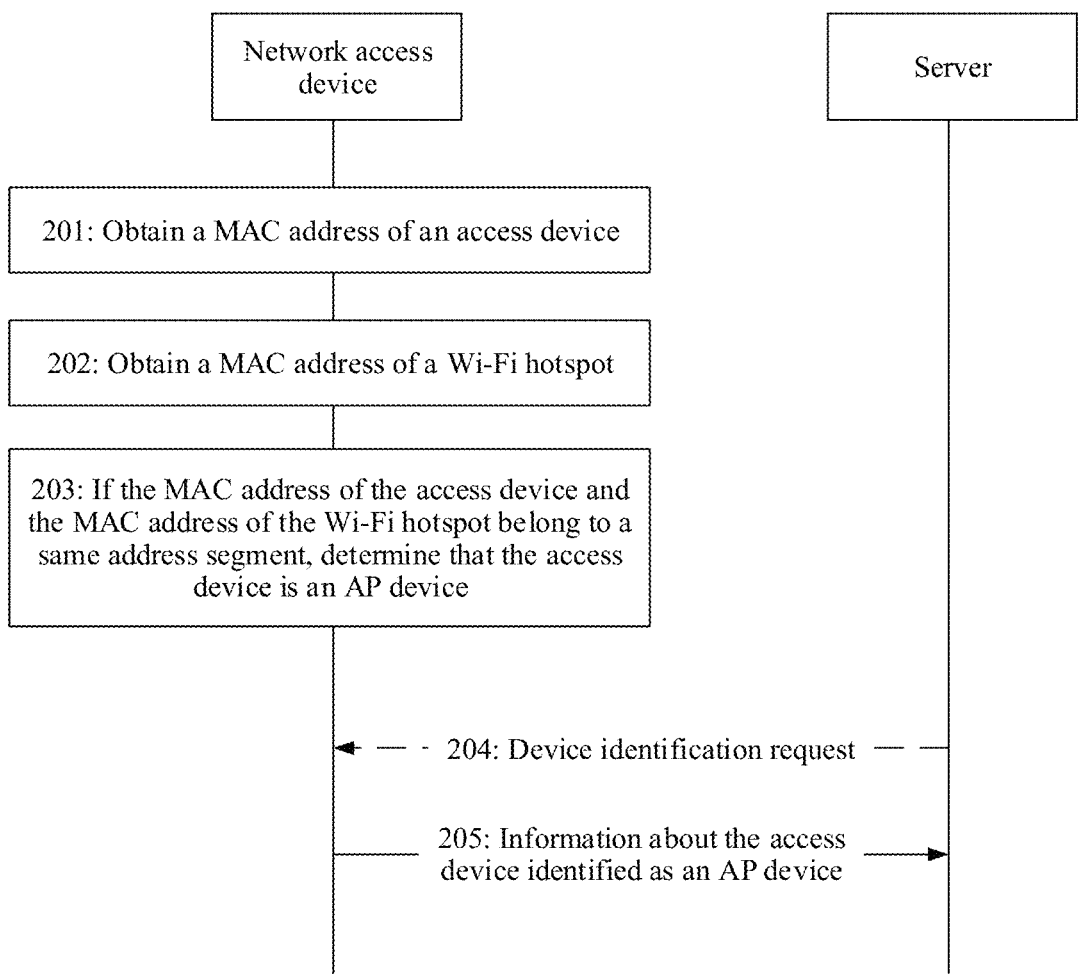
FIG. 2 is an example flowchart of a device identification method according to an embodiment of this application.

First, the following describes device identification methods provided in the embodiments of this application from the perspective of the network access device. FIG. 2 is an example flowchart of a device identification method according to an embodiment of this application.

The device identification method provided in this embodiment of this application includes the following steps.

201: The network access device obtains a MAC address of an access device.

In this embodiment, when it needs to be determined whether there is an AP device in the access devices connected to the network access device, the network access device may obtain MAC addresses of the access devices. It may be understood that, in a network, a unique IP address needs to be allocated to each device that accesses the network. Therefore, to allocate the unique IP address to each device that accesses the network, the access device usually connects to the network access device by using a DHCP protocol. When allocating an IP address to the access device, the DHCP usually needs to obtain related information about the access device, for example, information such as the MAC address of the access device and a name of the access device, then allocates the unique IP address to the access device, and associates the related information about the access device with the IP address allocated to the access device, to ensure that the unique IP address can be allocated to each access device. The related information about the access device and the IP address allocated to the access device are usually recorded in the network access device as DHCP information. Therefore, when the network access device needs to obtain the MAC address of the access device, the network access device may obtain the MAC address of the access device by obtaining the DHCP information corresponding to the access device. Specifically, the network access device may collect the corresponding DHCP information in a cascaded device list, to obtain the MAC address of the access device.

During actual application, the network access device has a built-in agent service, and the agent service may send a command to the network access device to obtain the MAC address of the access device. Specifically, the agent service built into the network access device first generates a GET_SUB_DEVICE_LIST command (namely, a device information obtaining command). Then the agent service sends the GET_SUB_DEVICE_LIST command to the network access device. The network access device collects, according to the GET_SUB_DEVICE_LIST command, the corresponding DHCP information in the cascaded device list. The cascaded device list includes a device connected to the network access device through a local area network interface (LAN interface) and a device connected to the network access device by using a Wi-Fi hotspot enabled by the network access device. In other words, the cascaded device list includes a device connected in a wired manner and a device connected in a wireless manner.

The GET_SUB_DEVICE_LIST command may be usually a command in a JSON format, and is mainly used to request to obtain information about the cascaded devices. Specifically, the GET_SUB_DEVICE_LIST command may be as follows:

```
{
    "name": "GET_SUB_DEVICE_LIST" //Name: Obtain a cascaded device list
    "params": {//Parameter:
        "param1": "paramValue" //Parameter 1: Parameter value
    }
}
```

Apparently, it can be learned from the foregoing example that the GET_SUB_DEVICE_LIST command is used to request to obtain a parameter value from the network access device to indicate to the network access device to obtain DHCP information corresponding to the cascaded devices.

Specifically, after obtaining the DHCP information corresponding to the cascaded devices, the network access device may return response information to the agent service. The response information corresponds to the GET_SUB_DEVICE_LIST command, and may be specifically shown as follows:

```
{
    "result": "successed" //Result: success
    "detail": {//Detailed information
        "detail1": "detailValue" //Detailed information 1: Detailed value
    }
}
```

After the agent service obtains the DHCP information returned by the network access device, the agent service may obtain, from the DHCP information, a MAC address corresponding to each access device in the cascaded device list.

It should be noted that, to enable the agent service to actively send a command to the network access device and obtain a corresponding MAC address, an API and a dynamic link library (DLL) file that can be invoked may be provided in advance for the agent service. The DLL file may provide code, data, or a function for the agent service, so that the agent service can invoke a function that does not belong to executable code of the agent service. Specifically, in this embodiment, the agent service may invoke a pre-provided API according to an instruction in the DLL file, to send a command to the network access device and obtain a corresponding MAC address.

In this embodiment, the API and the DLL file may be provided for the agent service by a server connected to the network access device, or may be provided for the agent service by operation and maintenance personnel through pre-installation in the network access device. This is not specifically limited herein. Generally, when the agent service needs to obtain the information about the cascaded device list and a corresponding API and DLL file are not installed in the network access device, the server may provide the API and the DLL file for the agent service, to ensure that the agent service can reliably obtain the information about the cascaded device list.

202: The network access device obtains a MAC address of a Wi-Fi hotspot.

In this embodiment, the agent service built in the network access device may also send a command to the network access device to obtain the MAC address of the Wi-Fi hotspot. The Wi-Fi hotspot is a Wi-Fi hotspot around the network access device (namely, a target area). The agent service may first generate a GET_NEIGH_BOUR command (namely, a hotspot information obtaining command). Then the agent service sends the GET_NEIGH_BOUR command to the network access device, so that the network access device can enable a Wi-Fi chip according to the GET_NEIGH_BOUR command, to collect information about a surrounding Wi-Fi hotspot. Finally, the network access device returns the collected Wi-Fi hotspot information to the agent service. The Wi-Fi hotspot information usually includes information such as the MAC address of the Wi-Fi hotspot and a name of the Wi-Fi hotspot. The agent service can obtain, based on the Wi-Fi hotspot information, the MAC address of the Wi-Fi hotspot around the network access device.

It may be understood that, because AP devices used in a user's home network are usually devices with relatively low power, effective transmission distances of Wi-Fi signals transmitted by the AP devices are usually about tens of meters (10 meters to 30 meters). Generally, a self-purchased AP device at the user's home network can effectively cover every corner of user's home. In addition, in a process in which a user builds a home network, a network access device provided by an operator is usually deployed at the user's home. Therefore, in this embodiment, the network access device deployed at the user's home can effectively collect information about a Wi-Fi hotspot covered at the user's home.

Specifically, the GET_NEIGH_BOUR command may be usually a command in a JSON format, and is mainly used to request the network access device to obtain the information about the Wi-Fi hotspot around the network access device. A specific information structure of the GET_NEIGH_BOUR command is similar to that of the GET_SUB_DEVICE_LIST command. For details, refer to the foregoing descriptions. Details are not described herein again.

It should be noted that, in this embodiment, there is no necessary sequence of performing step 201 and step 202. Step 201 may be performed first, or step 202 may be performed first, or step 201 and step 202 may be performed simultaneously. This is not specifically limited herein.

203: If the MAC address of the access device and the MAC address of the Wi-Fi hotspot belong to a same address segment, the network access device determines that the access device is an AP device.

In this embodiment, after the agent service obtains the MAC address of the access device and the MAC address of the Wi-Fi hotspot, the agent service may compare the MAC address of the access device and the MAC address of the Wi-Fi hotspot, to determine whether the MAC address of the access device and the MAC address of the Wi-Fi hotspot belong to a same address segment.

Determining whether the MAC address of the access device and the MAC address of the Wi-Fi hotspot belong to a same address segment may comprise: determining whether the MAC address of the access device and the MAC address of the Wi-Fi hotspot are adjacent addresses or determining whether both the MAC addresses are in a segment of consecutive addresses; and if the two addresses are the adjacent addresses or both are in the segment of consecutive addresses, determining that the access device is an AP device.

It may be understood that, it can be learned from the foregoing descriptions that the first six hexadecimal digits in a MAC address represent a number of a network hardware manufacturer, and the number is a fixed number allocated by the IEEE; and the last six hexadecimal digits in the MAC address represent a serial number of a network product manufactured by the manufacturer, and the serial number may be considered as a unique "identity" of the network product. In other words, the last six hexadecimal digits in the MAC address are defined by the manufacturer. Generally, to help manage network products, MAC addresses of the network products are numbered by the manufacturer according to a specific rule.

For an AP device, the manufacturer allocates a segment of consecutive addresses to the AP device for different MAC addresses, such as a MAC address of a Wi-Fi hotspot, an uplink MAC address, and a MAC address of a LAN interface. The MAC addresses are consecutive. Specifically, an example in which an AP device is a router is used. It is assumed that the router has one WAN interface (a wide area network interface configured to connect to the network access device), four LAN interfaces (local area network interface configured to connect to another network device, such as a personal computer or a notebook computer), and one frequency band of a Wi-Fi hotspot (For example, a Wi-Fi hotspot running on a 2.4 GHz or 5 GHz frequency band). In this case, the router has at least six consecutive MAC addresses. The WAN interface of the router corresponds to one uplink MAC address, and the uplink MAC address is a MAC address that can be obtained by the network access device by obtaining the DHCP information of the cascaded device list. The four LAN interfaces of the router correspond to four MAC addresses of the LAN interfaces. The frequency band of the Wi-Fi hotspot of the router corresponds to one MAC address of the hotspot. The six MAC addresses are consecutive. For example, the six MAC addresses may be specifically shown as follows:

The uplink MAC address is: 08:00:20:0A:8C:00.

The four MAC addresses of the LAN interfaces are: 08:00:20:0A:8C:01, 08:00:20:0A:8C:02, 08:00:20:0A:8C:03, 08:00:20:0A:8C:04.

The hotspot MAC address is: 08:00:20:0A:8C:05.

It can be learned from the foregoing example that the first ten hexadecimal digits of the six MAC addresses are the same, and last two hexadecimal digits are from 00 to 05, that is, the six MAC addresses are consecutive.

Based on the foregoing analysis, it can be learned that, for the AP device at the user's home, a MAC address used when the AP device accesses the network access device is the uplink MAC address, and a MAC address used when the AP device provides a wireless access service (that is, when the Wi-Fi hotspot is enabled) is another MAC address (namely, the MAC address of the hotspot). The two MAC addresses belong to a same address segment. Therefore, in this embodiment, the MAC address, of the access device, obtained by the network access device may be compared with the MAC address of the Wi-Fi hotspot. If the two MAC addresses belong to a same address segment, it may be considered that the two MAC addresses are addresses of a same device, that is, it is determined that the access device is an AP device having a function of enabling the Wi-Fi hotspot to provide the wireless access service.

Specifically, it is considered that different manufacturers may have different habits when allocating MAC addresses to AP devices, and for different AP devices, lengths of MAC address segments of the different AP devices are also different. In this embodiment, either of the following two methods is used to determine whether the MAC address of the access device and the MAC address of the Wi-Fi hotspot belong to a same address segment.

1. If an absolute value of a difference between the MAC address of the access device and the MAC address of the Wi-Fi hotspot is less than or equal to a preset threshold, it is determined that the MAC address of the access device and the MAC address of the Wi-Fi hotspot belong to a same address segment.

Because a MAC address is usually represented as 12 hexadecimal numbers, the MAC address may be actually considered as a digital value including 12 hexadecimal numbers. Therefore, after the MAC address of the access device and the MAC address of the Wi-Fi hotspot are obtained, each of the two MAC addresses may be converted into a specific digital value, to calculate the absolute value of the difference between the two digital values. If the absolute value of the difference is less than or equal to the preset threshold (for example, 256), it may be considered that the two MAC addresses belong to a same address segment. The preset threshold is set based on a habit of allocating an address segment to the AP device by most manufacturers. Generally, a length of an address segment allocated by a manufacturer to the AP device is not greater than 256, that is, a difference between two MAC addresses with a largest difference in the same AP device is not greater than 256. Therefore, the preset threshold may be set to 256 in this embodiment. It may be understood that, during actual application, the preset threshold may be adjusted according to an actual situation. A larger preset threshold indicates more access devices that are finally identified as AP devices, more access devices that are incorrectly identified as AP devices, and a higher identification error rate. However, it is not easy to misidentify some AP devices (that is, some AP devices are not identified). A smaller preset threshold indicates higher identification precision. Correspondingly, it is easier to miss identification. Therefore, during actual application, the preset threshold may be correspondingly adjusted according to a specific identification requirement.

For example, it is assumed that the MAC address of the access device is 07:16:76:00:02:FF, and the MAC address of the Wi-Fi hotspot is 07:16:76:00:03:00. Here, the first eight hexadecimal digits of the two MAC addresses are the same, that is, the absolute value of the difference between the two MAC addresses is determined by last four hexadecimal digits. 02:FF specifically corresponds to 767 (0*16³+2*16²+16*16¹+16*16⁰), and 03:00 specifically corresponds to 768 (0*16³+3*16²+0*16¹+0*16⁰). Therefore, the absolute value of the difference between the two MAC addresses is 1. Apparently, the MAC address of the access device and the MAC address of the Wi-Fi hotspot belong to a same address segment.

During actual application, each of the MAC address of the access device and the MAC address of the Wi-Fi hotspot may be converted into a digital value including 12 hexadecimal digits, and then the difference between the two converted digital values with hexadecimal digits is calculated, to obtain the absolute value of the difference between the two MAC addresses. Alternatively, after each of the MAC address of the access device and the MAC address of the Wi-Fi hotspot is converted into a digital value including decimal digits, a difference between the two converted digital values with decimal digits is calculated, to obtain the absolute value of the difference between the two MAC addresses. A specific process of calculating the absolute value of the difference is not limited herein.

In addition, in a process of determining the absolute value of the difference between the MAC address of the access device and the MAC address of the Wi-Fi hotspot, the corresponding absolute value of the difference may be calculated starting from low-order digital values of the two MAC addresses. After the absolute value of the difference between the low-order digital values of the two MAC addresses meets a condition of being less than or equal to the preset threshold, the absolute value of the difference between high-order digital values of the two MAC addresses is calculated. For example, it is assumed that the preset threshold is 10, the MAC address of the access device is 07:16:76:00:02:20, and the MAC address of the Wi-Fi hotspot is 07:16:76:00:02:30. In the process of determining the absolute value of the difference between the two MAC addresses, the absolute value of the difference between last two digital values of the two MAC addresses may be compared first. Last two digital values of the MAC address of the access device are 20 (which are 32 after being converted into decimal notation), and last two digital values of the MAC address of the Wi-Fi hotspot are 30 (which are 48 after being converted into decimal notation). Apparently, the absolute value of the difference between the last two digital values of the MAC address of the access device and the MAC address of the Wi-Fi hotspot is 16 (48:32), and is greater than the preset threshold whose value is 10. Therefore, in this case, it may be determined that the MAC address of the access device and the MAC address of the Wi-Fi hotspot do not belong to a same address segment. There is no need to continue to compare differences between other digital values of the two MAC addresses, and there is no need to convert an entire MAC address into a specific digital value (for example, a hexadecimal digit or a decimal digit) and then perform difference calculation. Therefore, a calculation amount is reduced.

2. If a first digital value to an $N^{th}$ digital value of the MAC address of the access device are the same as a first digital value to an $N^{th}$ digital value of the MAC address of the Wi-Fi hotspot, it is determined that the MAC address of the access device and the MAC address of the Wi-Fi hotspot belong to a same address segment, where N is an integer greater than 1.

It may be understood that, for some manufacturers, to facilitate production management of the AP device, when the manufacturers allocate MAC addresses to the AP device, first several digital values of a plurality of MAC addresses allocated to the AP device are usually the same. The six MAC addresses corresponding to the router is used as an example, and the six MAC addresses are respectively:

08:00:20:0A:8C:00,
08:00:20:0A:8C:01,
08:00:20:0A:8C:02,
08:00:20:0A:8C:03,
08:00:20:0A:8C:04,
08:00:20:0A:8C:05.

Clearly, the first ten digital values of the six MAC addresses are the same, and only the last two digital values are different. Based on this, in this embodiment, whether the two MAC addresses belong to a same address segment may be determined by comparing whether the first N digital values of the MAC address of the access device and the MAC address of the Wi-Fi hotspot are the same. N is an integer greater than 1, and may be specifically a value such as 9, 10, or 11. During actual application, a value of N may be set according to a specific requirement. It may be understood that a larger value of N indicates a higher condition that needs to be met for identifying the access device as an AP device. For example, when N is 11, only when the first 11 digital values of the MAC address of the access device are the same as the first 11 digital values of the MAC address of the Wi-Fi hotspot, the access device is identified as an AP device. In other words, a larger value of N indicates higher identification precision but a higher miss recognition probability. A smaller value of N indicates lower identification precision but a lower miss recognition probability. Therefore, during actual application, the value of N may be adaptively adjusted according to an actual identification requirement, to achieve a better balance between identification precision and a miss recognition probability.

In addition, in this embodiment, after it is determined that the MAC address of the access device and the MAC address of the Wi-Fi hotspot belong to a same address segment, in addition to determining that the access device is an AP device, it may be further determined that the access device and a device that enables the Wi-Fi hotspot are a same device. In other words, the information about the access device may be associated with the Wi-Fi hotspot information, and the access device is considered as the device that enables the Wi-Fi hotspot. In this way, in some scenarios (for example, in a scenario in which the device that enables the Wi-Fi hotspot needs to be determined), information about the device that enables the Wi-Fi hotspot can be quickly provided, and a feasible solution is provided for how to determine the device that enables the Wi-Fi hotspot. Therefore, flexibility of the solution is improved.

204: The network access device receives a device identification request sent by the server.

In this embodiment, when the operation and maintenance personnel responsible for home network management need to learn whether there is a self-purchased AP device at a user's home, the operation and maintenance personnel may deliver a device identification request instruction on a home network management system of the server, so that the server sends the device identification request to the network access device at the user's home. The home network management system is a software system deployed on the server, can be in communication connection with the network access device at user's home, and is mainly configured to manage the user's home network. The home network management system may send the device identification request to the network access device through an MQTT channel. Specifically, the home network management system may periodically send the device identification request to the network access device by using the server (for example, the operation and maintenance personnel preset an instruction for the home network management system to periodically trigger sending the device identification request). Alternatively, the server may be used to send the device identification request to the network access device when the operation and maintenance personnel need to query whether there is an AP device in the user's home network. This is not specifically limited herein.

205: The network access device sends the information about the access device identified as an AP device to the server.

In this embodiment, steps such as the network access device obtains the MAC address of the access device, obtains the MAC address of the Wi-Fi hotspot, and determines, based on the MAC address of the access device and the MAC address of the Wi-Fi hotspot, whether the access device is an AP device may be performed after the network access device is enabled, or performed at an interval of a specific period in a working process of the network access device. After the network access device determines that one or more specific access devices are AP devices, the network access device may store the information corresponding to the access devices identified as AP devices in a local storage space. After obtaining the device identification request sent by the server, the network access device may send, to the server, the information that corresponds to the access device identified as an AP device and that is pre-stored in the local storage space. The information about the access device identified as an AP device may specifically include one or more of the MAC address of the access device or the device name of the access device. It may be understood that the information about the access device may be obtained when the DHCP information is obtained. Because the DHCP information usually includes the information such as the name of the access device and the MAC address of the access device, after an access device is determined as an AP device, the DHCP information corresponding to the access device may be stored in the local storage space as to-be-reported information of the access device. The to-be-reported information corresponding to the access device is sent to the server when the network access device obtains the device identification request delivered by the server. Apparently, the network access device actively performs the step of identifying the access device and stores the information about the access device identified as an AP device, so that the network access device can quickly feed the corresponding information back to the server when the network access device obtains the device identification request. This ensures a speed of obtaining the information about the AP device, and helps the operation and maintenance personnel quickly rectify a fault.

In addition, in this embodiment, the network access device sends the corresponding information about the access device to the server after the network access device receives the device identification request sent by the server. Alternatively, the network access device may actively send, at an interval of a specific period, the information about the access device identified as an AP device to the server, that is, the network access device periodically and actively feeds the information about the access device identified as an AP device back to the server. For example, the network access device periodically identifies whether there is an AP device in a currently connected access device, and after obtaining an identification result, the network access device actively sends information about an access device identified as an AP device to the server. It should be noted that the network access device may feed the identification result back to the server each time after the network access device identifies the AP device, regardless of whether the identification result is that there is an AP device or that there is not an AP device. In addition, after receiving the information that is sent by the network access device and that corresponds to the access device identified as an AP device, the server usually stores the information about the access device in a database. Alternatively, the network access device may feed the information corresponding to the newly identified AP device back to the server after the network access device identifies a new AP device, and does not need to feed the corresponding identification result back to the server each time after the network access device identifies the AP device. It may be understood that, when the network access device actively sends the information about the access device to the server, after the server receives the information that is sent by the network access device and that is about the access device identified as an AP device, the server may store the information about the access device in the database, to display the information in time when required. For example, when the operation and maintenance personnel need to learn whether there is an AP device in a home network of a home user, the operation and maintenance personnel may obtain the information by querying the database in the home network management system of the server.

In this embodiment of this application, the MAC address corresponding to the access device and the MAC address of the Wi-Fi hotspot at a user's home are obtained, and then whether the MAC address of the access device and the MAC address of the Wi-Fi hotspot belong to a same segment of consecutive addresses is determined, to determine whether the access device and the device that enables the Wi-Fi hotspot are the same device, and then identify whether the access device is an AP device. In the identification process, only the MAC address of the access device and the MAC address of the Wi-Fi hotspot need to be obtained, and an identification library does not need to be maintained. Therefore, identification costs can be reduced.

For ease of understanding, the following describes in detail the device identification method provided in this embodiment of this application with reference to a specific example.

First, a home network management system deployed on a server provides an API and a DLL file that can be invoked for an agent service built in a network access device. After the network access device is enabled, the network access device may obtain the API and the DLL file that are provided by the home network management system. The network access device may enable the built-in agent service of the network access device, and the agent service loads the API and the DLL file. When an access device accesses the network access device by using a DHCP protocol, the network access device may record DHCP information corresponding to the access device. The DHCP information specifically includes information such as a MAC address of the access device and a device name of the access device. Second, after the agent service loads the API and the DLL file, the agent service invokes the pre-provided API according to an instruction in the DLL file, so as to send a GET_SUB_DEVICE_LIST command to the network access device. The network access device collects, according to the GET_SUB_DEVICE_LIST command, the DHCP information corresponding to the access device connected to the network access device, and then returns the collected DHCP information to the agent service after collecting the DHCP information. The collected DHCP information specifically includes the information such as the MAC address of the access device and the device name of the access device. In addition, the agent service invokes the pre-provided API according to the instruction in the DLL file to send a GET_NEIGH_BOUR command to the network access device. The network access device enables, according to the GET_NEIGH_BOUR command, a Wi-Fi chip to collect information about a surrounding Wi-Fi hotspot, and returns the corresponding Wi-Fi hotspot information to the agent service after the collection is completed. The Wi-Fi hotspot information specifically includes information such as a MAC address of the Wi-Fi hotspot and a name of the Wi-Fi hotspot. Finally, the agent service determines whether the MAC address of the access device and the MAC address of the Wi-Fi hotspot belong to a same address segment. If the MAC address of the access device and the MAC address of the Wi-Fi hotspot belong to a same address segment, the agent service determines that the access device is an AP device, and sends the information about the access device to the server.

Figure 3:
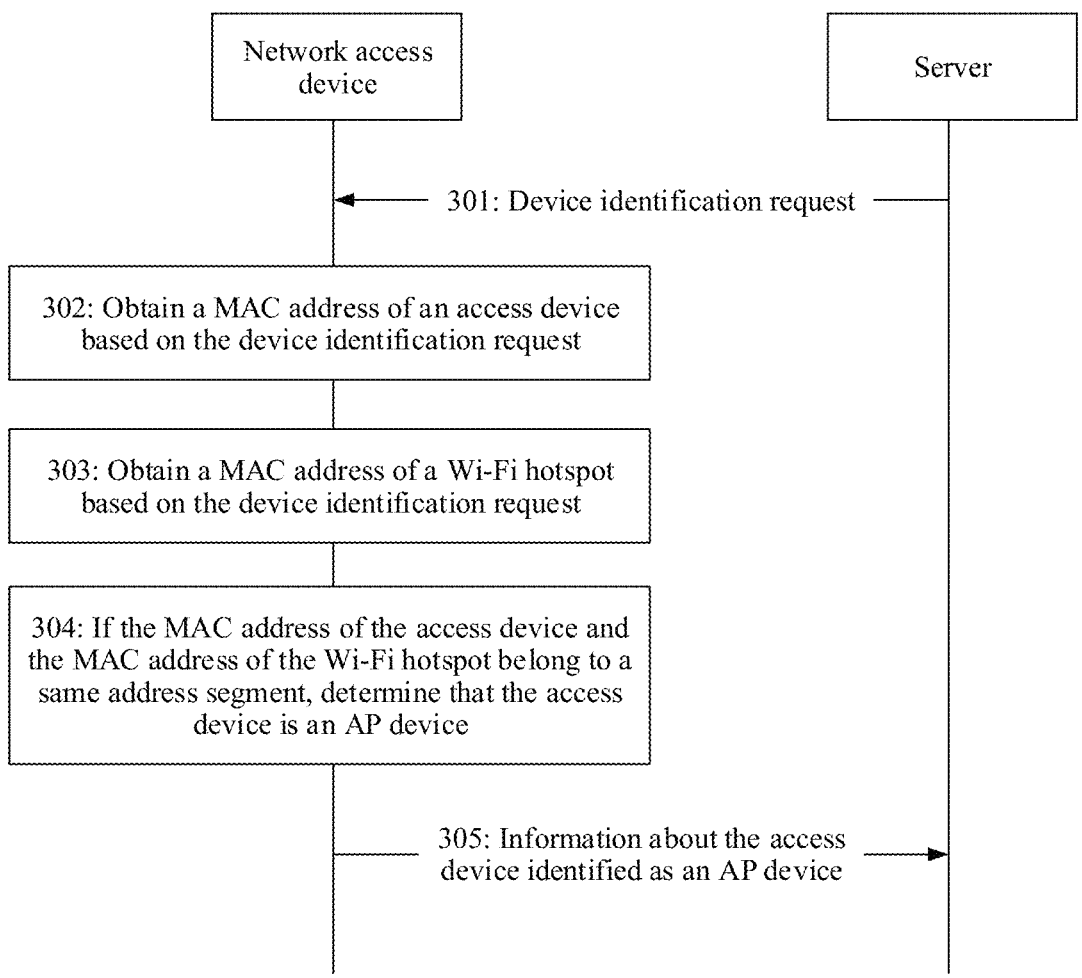
FIG. 3 is another example flowchart of a device identification method according to an embodiment of this application.

FIG. 3 is another example flowchart of a device identification method according to an embodiment of this application.

The device identification method provided in this embodiment of this application includes the following steps.

301: A network access device receives a device identification request sent by a server.

In this embodiment, when operation and maintenance personnel at a server side need to determine whether there is an AP device in access devices connected to the network access device, the operation and maintenance personnel may deliver a device identification request instruction on a home network management system of the server, so that the server sends the device identification request to the network access device at a user's home.

In addition, if an agent service does not have a corresponding API and a corresponding DLL file, the server may provide the API and the DLL file for the agent service before or after sending the device identification request to the network access device. For functions of the API and the DLL file, refer to step 201 and step 202. Details are not described herein again.

It may be understood that the device identification request in this embodiment of this application may be specifically one piece of request information, or two pieces of request information. When the device identification request is one piece of request information, the request information is used to request to obtain both a MAC address of the access device and a MAC address of a Wi-Fi hotspot. When the device identification request is two pieces of request information, the two pieces of request information are used to request to obtain a MAC address of the access device and a MAC address of a Wi-Fi hotspot respectively. In addition, the two pieces of request information may be sent simultaneously, or may be sent in any sequence. A sequence of sending the two pieces of request information is not limited herein.

302: The network access device obtains the MAC address of the access device based on the device identification request.

In this embodiment, after receiving the device identification request sent by the server, the agent service built in the network access device obtains the MAC address of the access device based on the device identification request. In other words, in this embodiment, after receiving the device identification request, the agent service obtains the MAC address of the access device. Specifically, a step in which the agent service obtains the MAC address of the access device is similar to step 201. For details, refer to step 201. Details are not described herein again.

303: The network access device obtains the MAC address of the Wi-Fi hotspot based on the device identification request.

In this embodiment, after receiving the device identification request sent by the server, the agent service built in the network access device obtains the MAC address of the Wi-Fi hotspot based on the device identification request. Likewise, in this embodiment, after receiving the device identification request, the agent service obtains the MAC address of the Wi-Fi hotspot. Specifically, a step in which the agent service obtains the MAC address of the Wi-Fi hotspot is similar to step 202. For details, refer to step 202. Details are not described herein again.

It should be noted that, in this embodiment, there is no necessary sequence of performing step 302 and step 303. Step 302 may be performed first, or step 303 may be performed first, or step 302 and step 303 may be performed simultaneously. This is not specifically limited herein.

304: If the MAC address of the access device and the MAC address of the Wi-Fi hotspot belong to a same address segment, the network access device determines that the access device is an AP device.

In this embodiment, step 304 is similar to step 203. For details, refer to step 203. Details are not described herein again.

305: The network access device sends information about the access device identified as an AP device to the server.

In this embodiment, step 305 is similar to step 205. For details, refer to step 205. Details are not described herein again.

In this embodiment, a main difference between step 301 to step 305 and step 201 to step 205 lies in that: in step 301 to step 305, the network access device obtains the MAC address of the access device and the MAC address of the Wi-Fi hotspot based on the device identification request after receiving the device identification request sent by the server, determines, based on the two MAC addresses, whether the access device is an AP device, and finally sends the information about the access device determined as an AP device to the server, but in step 201 to step 205, the network access device actively obtains the MAC address of the access device and the MAC address of the Wi-Fi hotspot, determines, based on the two MAC addresses, whether the access device is an AP device, and then the network access device actively sends the information about the access device determined as an AP device to the server; or stores the information about the access device determined as an AP device locally, and sends the information about the access device to the server after the network access device obtains the device identification request sent by the server. In other words, in step 301 to step 305, the network access device identifies the AP device after receiving the device identification request sent by the server, but in step 201 to step 205, the network access device actively identifies the AP device, and then actively feeds back the identification result to the server; or sends the pre-obtained identification result after receiving the device identification request sent by the server.

Apparently, in this embodiment, the network access device identifies the device after receiving the device identification request sent by the server, to ensure that an identification result is obtained based on the access device currently connected to the network access device and the Wi-Fi hotspot around the network access device. This ensures timeliness of the identification result, avoids frequently sending the identification result to the server by the network access device, and reduces signaling consumption.

Figure 4:
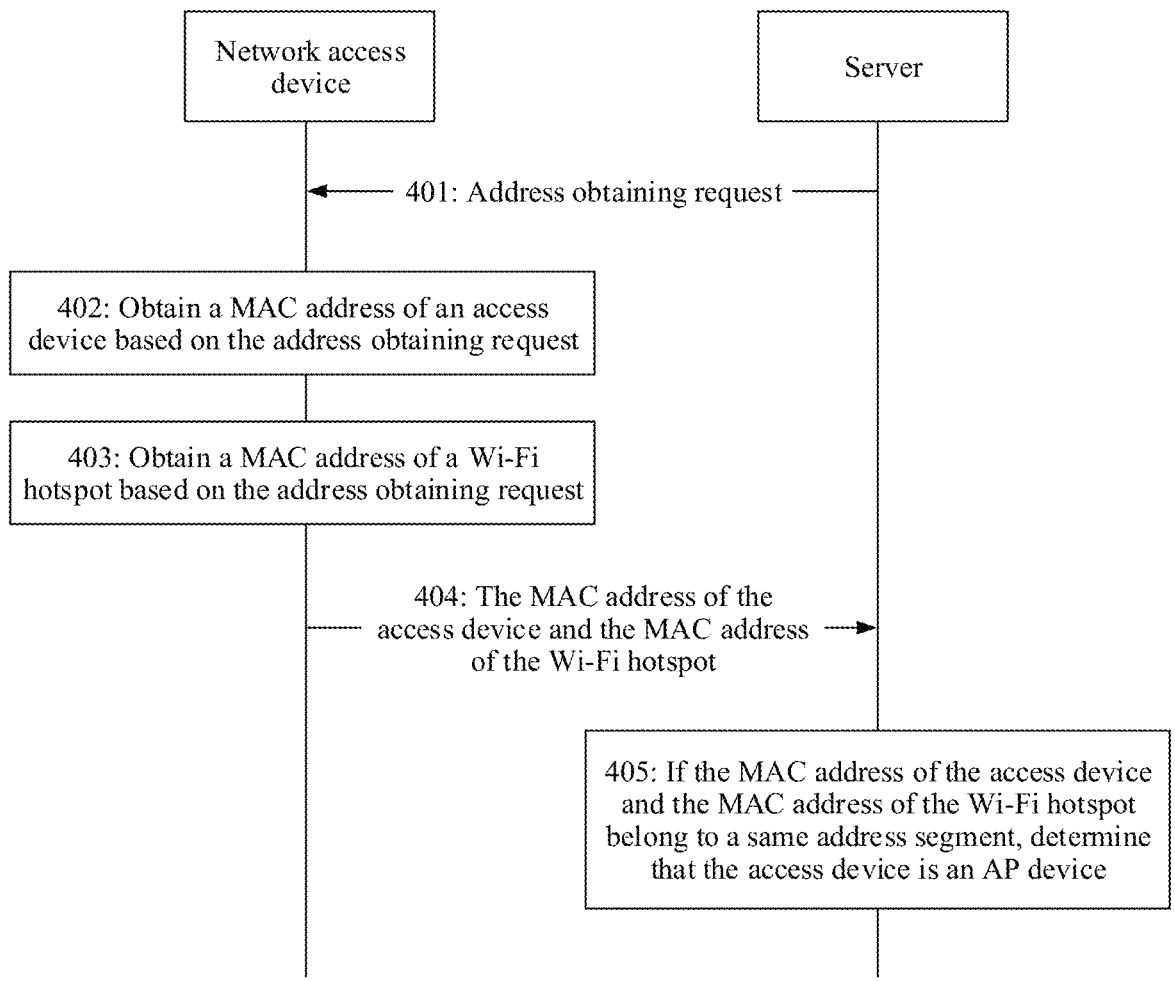
FIG. 4 is an example flowchart of a device identification method according to an embodiment of this application.

The foregoing describes the device identification method provided in the embodiments of this application from the perspective of the network access device. The following describes in detail a device identification method provided in an embodiment of this application from the perspective of the server. FIG. 4 is an example flowchart of the device identification method according to the embodiment of this application.

The device identification method provided in this embodiment of this application includes the following steps.

401: A server sends an address obtaining request to a network access device.

In this embodiment, the address obtaining request is mainly used to indicate the network access device to obtain a MAC address of an access device and a MAC address of a Wi-Fi hotspot. The address obtaining request may be specifically one piece of request information used to request both the MAC address of the access device and the MAC address of the Wi-Fi hotspot. Alternatively, the address obtaining request may be two pieces of request information used to request the MAC address of the access device and the MAC address of the Wi-Fi hotspot respectively. This is not specifically limited herein.

402: The network access device obtains the MAC address of the access device based on the address obtaining request.

In this embodiment, a process in which the network access device obtains the MAC address of the access device is similar to step 201. For details, refer to step 201. Details are not described herein again.

403: The network access device obtains the MAC address of the Wi-Fi hotspot based on the address obtaining request.

In this embodiment, a process in which the network access device obtains the MAC address of the Wi-Fi hotspot is similar to step 202. For details, refer to step 202. Details are not described herein again.

It should be noted that, in this embodiment, there is no necessary sequence of performing step 402 and step 403. Step 402 may be performed first, or step 403 may be performed first, or step 402 and step 403 may be performed simultaneously. This is not specifically limited herein.

404: The server receives the MAC address of the access device and the MAC address of the Wi-Fi hotspot that are sent by the network access device.

In this embodiment, after obtaining the MAC address of the access device and the MAC address of the Wi-Fi hotspot based on the address obtaining request, the network access device may send the MAC address of the access device and the MAC address of the Wi-Fi hotspot to the server. The two MAC addresses may be simultaneously sent by the network access device, or may be sent in any sequence. A sequence of sending the two MAC addresses is not limited herein.

405: If the MAC address of the access device and the MAC address of the Wi-Fi hotspot belong to a same address segment, the server determines that the access device is an AP device.

In this embodiment, the server performs a process of identifying whether the access device is an AP device. In other words, the network access device is mainly responsible for obtaining the MAC address of the access device and the MAC address of the Wi-Fi hotspot, and the server determines, based on the MAC address of the access device and the MAC address of the Wi-Fi hotspot, whether the access device is an AP device. Specifically, the process in which the server determines whether the access device is an AP device is similar to step 203, and details are not described herein again.

In this embodiment, the network access device mainly obtains the MAC address of the access device and the MAC address of the Wi-Fi hotspot based on the address obtaining request sent by the server. The server determines, based on the MAC address of the access device and the MAC address of the Wi-Fi hotspot, whether the access device is an AP device. The determining process is performed by the server with higher processing efficiency, to reduce load of the network access device, and improve efficiency of the determining process.

Figure 5:
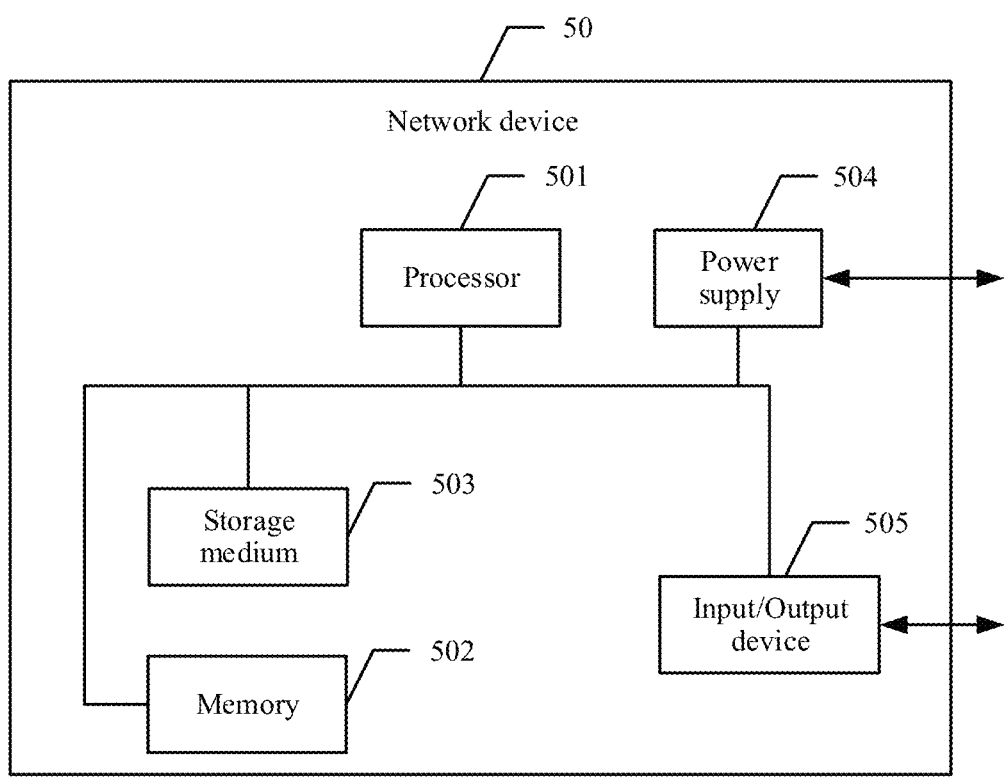
FIG. 5 is a schematic diagram of a structure of a network device according to an embodiment.

The foregoing describes the device identification method provided in the embodiments of this application. The following describes a network device 50 used in the device identification method. FIG. 5 is a schematic diagram of a structure of the network device according to an embodiment of this application. The network device 50 may differ greatly due to different configurations or performance, and may include one or more processors 501 and a memory 502, and one or more storage media 503 (for example, one or more mass storage devices) for storing application programs or data. The memory 502 and the storage medium 503 may be used for temporary storage or permanent storage. The network device further includes one or more input/output devices 505. The input/output device 505 is configured to: obtain a performance indicator, or output and display an analysis result.

Further, the processor 501 may be configured to communicate with the storage medium 503. The processor 501 is configured to execute the application programs in the storage medium 503. Specifically, the processor is configured to perform the following steps: obtaining a MAC address of an access device; obtaining a MAC address of a Wi-Fi hotspot; and determining, if the MAC address of the access device and the MAC address of the Wi-Fi hotspot belong to a same address segment, that the access device is an access point AP device, where the address segment includes a plurality of consecutive MAC addresses.

In some feasible implementations, the processor is specifically configured to: if an absolute value of a difference between the MAC address of the access device and the MAC address of the Wi-Fi hotspot is less than or equal to a preset threshold, determine that the access device is an AP device.

In some feasible implementations, the processor is further configured to: if a first digital value to an $N^{th}$ digital value of the MAC address of the access device are the same as a first digital value to an $N^{th}$ digital value of the MAC address of the Wi-Fi hotspot, determine that the access device is an AP device, where N is an integer greater than 1.

In some feasible implementations, the processor is further configured to send an address obtaining request to a network access device. The address obtaining request is used to indicate the network access device to obtain the MAC address of the access device and the MAC address of the Wi-Fi hotspot.

In some feasible implementations, the processor is further configured to: generate a device information obtaining command, and obtain DHCP information according to the device information obtaining command, where the DHCP information includes the MAC address of the access device; and generate a hotspot information obtaining command, and obtain Wi-Fi hotspot information in a target area according to the hotspot information obtaining command, where the Wi-Fi hotspot information includes the MAC address of the Wi-Fi hotspot.

In some feasible implementations, the processor is further configured to send information about the access device determined as an AP device to a server, where the information about the access device includes one or more of the MAC address or a device name.

In some feasible implementations, the processor is further configured to: receive a device identification request sent by a server; and send, based on the device identification request, information about the access device identified as an AP device to the server, where the information about the access device includes one or more of the MAC address or a device name.

In some feasible implementations, the processor is further configured to: if the MAC address of the access device and the MAC address of the Wi-Fi hotspot belong to a same address segment, determine that the access device and a device that enables the Wi-Fi hotspot are a same device.

Figure 6:
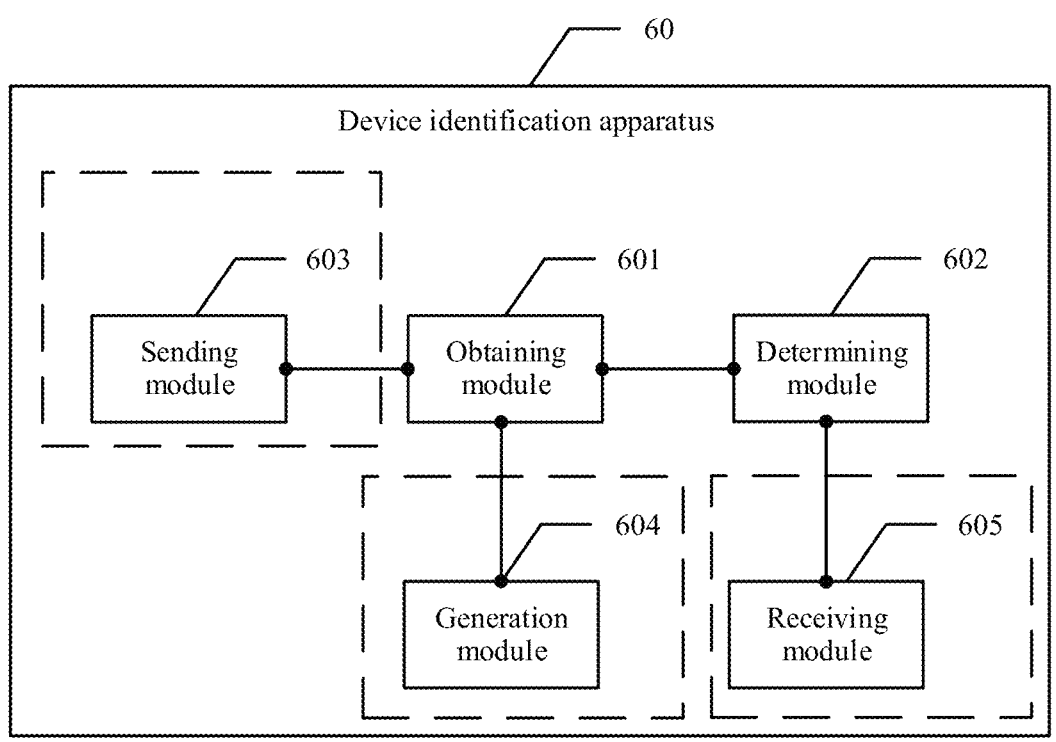
FIG. 6 is a schematic diagram of a structure of a device identification apparatus according to an embodiment.

FIG. 6 is a schematic diagram of a structure of a device identification apparatus according to an embodiment.

The device identification apparatus provided in the embodiment of this application includes: an obtaining module 601, configured to obtain a media access control MAC address of an access device, where the obtaining module 601 is further configured to obtain a MAC address of a wireless fidelity Wi-Fi hotspot; and a determining module 602, configured to: if the MAC address of the access device and the MAC address of the Wi-Fi hotspot belong to a same address segment, determine that the access device is an access point AP device, where the address segment includes a plurality of consecutive MAC addresses.

In some feasible implementations, the determining module 602 is further configured to: if an absolute value of a difference between the MAC address of the access device and the MAC address of the Wi-Fi hotspot is less than or equal to a preset threshold, determine that the access device is an AP device.

In some feasible implementations, the determining module 602 is further configured to: if a first digital value to an $N^{th}$ digital value of the MAC address of the access device are the same as a first digital value to an $N^{th}$ digital value of the MAC address of the Wi-Fi hotspot, determine that the access device is an AP device, where N is an integer greater than 1.

In some feasible implementations, the device identification apparatus 60 further includes: a sending module 603, where the sending module 603 is configured to send an address obtaining request to a network access device. The address obtaining request is used to indicate the network access device to obtain the MAC address of the access device and the MAC address of the Wi-Fi hotspot. The obtaining module 601 is further configured to obtain the MAC address of the access device that is sent by the network access device. The obtaining module 601 is further configured to obtain the MAC address of the Wi-Fi hotspot that is sent by the network access device.

In some feasible implementations, the device identification apparatus 60 further includes: a generation module 604, where the generation module 604 is configured to generate a device information obtaining command. The obtaining module 601 is further configured to obtain DHCP information according to the device information obtaining command, where the DHCP information includes the MAC address of the access device. The generation module 604 is further configured to generate a hotspot information obtaining command. The obtaining module 601 is further configured to obtain Wi-Fi hotspot information in a target area according to the hotspot information obtaining command, where the Wi-Fi hotspot information includes the MAC address of the Wi-Fi hotspot.

In some feasible implementations, the sending module 603 is further configured to send information about the access device determined as an AP device to a server, where the information about the access device includes one or more of the MAC address or a device name.

In some feasible implementations, the device identification apparatus 60 further includes a receiving module 605, where the receiving module 605 is configured to receive a device identification request sent by a server. The sending module 603 is further configured to send, based on the device identification request, information about the access device identified as an AP device to the server, where information about the access device includes one or more of the MAC address or a device name.

In some feasible implementations, the determining module 602 is further configured to: if the MAC address of the access device and the MAC address of the Wi-Fi hotspot belong to a same address segment, determine that the access device and a device that enables the Wi-Fi hotspot are a same device.

In this embodiment of this application, the MAC address corresponding to the access device and the MAC address of the Wi-Fi hotspot at a user's home are obtained, and then whether the MAC address of the access device and the MAC address of the Wi-Fi hotspot belong to a same segment of consecutive addresses is determined, to determine whether the access device and the device that enables the Wi-Fi hotspot are the same device, and then identify whether the access device is an AP device. In the identification process, only the MAC address of the access device and the MAC address of the Wi-Fi hotspot need to be obtained, and an identification library does not need to be maintained. Therefore, identification costs can be reduced.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A device identification method, comprising:
obtaining a medium access control (MAC) address of an access device;
obtaining a MAC address of a wireless fidelity Wi-Fi hotspot; and
determining that the access device is an access point (AP), wherein the MAC address of the access device and the MAC address of the Wi-Fi hotspot belong to a same address segment, wherein the address segment comprises a plurality of consecutive MAC addresses.

2. The device identification method according to claim 1, wherein determining that the access device is the AP comprises:
determining that an absolute value of a difference between the MAC address of the access device and the MAC address of the Wi-Fi hotspot is less than or equal to a preset threshold.

3. The device identification method according to claim 1, wherein determining that the access device is the AP comprises:
determining that a first digital value to an Nth digital value of the MAC address of the access device are the same as a first digital value to an Nth digital value of the MAC address of the Wi-Fi hotspot, wherein N is an integer greater than 1.

4. The device identification method according to claim 1, wherein before obtaining the MAC address of the access device and before obtaining the MAC address of the Wi-Fi hotspot, the method further comprises:
sending an address obtaining request to a network access device, wherein the address obtaining request is used to indicate to the network access device to obtain the MAC address of the access device and the MAC address of the Wi-Fi hotspot;
obtaining the MAC address of the access device comprises:
obtaining the MAC address of the access device sent by the network access device; and
obtaining the MAC address of the Wi-Fi hotspot comprises:

obtaining the MAC address of the Wi-Fi hotspot sent by the network access device.

5. The device identification method according to claim 1, wherein obtaining the MAC address of the access device comprises:
generating a device information obtaining command; and
obtaining dynamic host configuration protocol (DHCP) information according to the device information obtaining command, wherein the DHCP information comprises the MAC address of the access device; and
obtaining the MAC address of the Wi-Fi hotspot comprises:
generating a hotspot information obtaining command; and
obtaining Wi-Fi hotspot information in a target area according to the hotspot information obtaining command, wherein the Wi-Fi hotspot information comprises the MAC address of the Wi-Fi hotspot.

6. The device identification method according to claim 1, wherein after determining that the access device is the AP, the method further comprises:
sending information about the access device to a server, wherein the information about the access device comprises one or more of the MAC address of the access device or a device name.

7. The device identification method according to claim 1, wherein the method further comprises:
receiving a device identification request sent by a server; and
sending, based on the device identification request, information about the access device to the server, wherein the information about the access device comprises one or more of the MAC address of the access device or a device name.

8. The device identification method according to claim 1, wherein the method further comprises:
determining that the access device and a device that enables the Wi-Fi hotspot are a same device.

9. An apparatus, comprising:
at least one processor;
one or more memories coupled to the at least one processor and storing instructions which when executed by the at least one processor cause the apparatus to:
obtain a medium access control (MAC) address of an access device;
obtain a MAC address of a wireless fidelity Wi-Fi hotspot; and
determine that the access device is an access point (AP), wherein the MAC address of the access device and the MAC address of the Wi-Fi hotspot belong to a same address segment, wherein the address segment comprises a plurality of consecutive MAC addresses.

10. The apparatus according to claim 9, wherein the instructions executed by the at least one processor further cause the apparatus to:
determine that an absolute value of a difference between the MAC address of the access device and the MAC address of the Wi-Fi hotspot is less than or equal to a preset threshold.

11. The apparatus according to claim 9, wherein the instructions executed by the at least one processor further cause the apparatus to:
determine that a first digital value to an Nth digital value of the MAC address of the access device are the same as a first digital value to an Nth digital value of the MAC address of the Wi-Fi hotspot, wherein N is an integer greater than 1.

12. The apparatus according to claim 9, wherein the instructions executed by the at least one processor further cause the apparatus to:
send an address obtaining request to a network access device, wherein the address obtaining request is used to indicate to the network access device to obtain the MAC address of the access device and the MAC address of the Wi-Fi hotspot;
obtain the MAC address of the access device that is sent by the network access device; and
obtain the MAC address of the Wi-Fi hotspot that is sent by the network access device.

13. The apparatus according to claim 9, wherein the instructions executed by the at least one processor further cause the apparatus to:
generate a device information obtaining command; and
obtain dynamic host configuration protocol (DHCP) information according to the device information obtaining command, wherein the DHCP information comprises the MAC address of the access device; and
generate a hotspot information obtaining command; and
obtain Wi-Fi hotspot information in a target area according to the hotspot information obtaining command, wherein the Wi-Fi hotspot information comprises the MAC address of the Wi-Fi hotspot.

14. The apparatus according to claim 9, wherein the instructions executed by the at least one processor further cause the apparatus to:
send information about the access device to a server, wherein the information about the access device comprises one or more of the MAC address of the access device or a device name.

15. The apparatus according to claim 9, wherein the instructions executed by the at least one processor further cause the apparatus to:
receive a device identification request sent by a server; and
send, based on the device identification request, information about the access device to the server, wherein the information about the access device comprises one or more of the MAC address of the access device or a device name.

16. The apparatus according to claim 9, wherein the instructions executed by the at least one processor further cause the apparatus to:
determine that the access device and a device that enables the Wi-Fi hotspot are a same device.

17. A non-transitory storage medium storing a program, which when executed by one or more processors, cause the one or more processors to perform operations, the operations comprising:
obtaining a medium access control (MAC) address of an access device;
obtaining a MAC address of a wireless fidelity Wi-Fi hotspot; and
determining that the access device is an access point (AP), wherein the MAC address of the access device and the MAC address of the Wi-Fi hotspot belong to a same address segment, wherein the address segment comprises a plurality of consecutive MAC addresses.

18. The non-transitory storage medium according to claim 17, wherein the operations further comprise:
determining that an absolute value of a difference between the MAC address of the access device and the MAC address of the Wi-Fi hotspot is less than or equal to a preset threshold.

19. The non-transitory storage medium according to claim 17, wherein the operations further comprise:
  determining that a first digital value to an Nth digital value of the MAC address of the access device are the same as a first digital value to an Nth digital value of the MAC address of the Wi-Fi hotspot, wherein N is an integer greater than 1.

20. The non-transitory storage medium according to claim 17, wherein the operations further comprise:
  sending an address obtaining request to a network access device, wherein the address obtaining request is used to indicate to the network access device to obtain the MAC address of the access device and the MAC address of the Wi-Fi hotspot;
  obtaining the MAC address of the access device sent by the network access device; and
  obtaining the MAC address of the Wi-Fi hotspot sent by the network access device.

* * * * *